(12) United States Patent
Nguyen et al.

(10) Patent No.: US 11,326,434 B2
(45) Date of Patent: May 10, 2022

(54) METHODS FOR ENHANCING HYDROCARBON PRODUCTION FROM SUBTERRANEAN FORMATIONS USING ELECTRICALLY CONTROLLED PROPELLANT

(71) Applicant: Halliburton Energy Services, Inc., Houston, TX (US)

(72) Inventors: Philip D. Nguyen, Houston, TX (US); Golchehreh Salamat, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 163 days.

(21) Appl. No.: 16/626,129

(22) PCT Filed: Aug. 4, 2017

(86) PCT No.: PCT/US2017/045518
§ 371 (c)(1),
(2) Date: Dec. 23, 2019

(87) PCT Pub. No.: WO2019/027470
PCT Pub. Date: Feb. 7, 2019

(65) Prior Publication Data
US 2021/0148210 A1   May 20, 2021

(51) Int. Cl.
*E21B 43/263* (2006.01)
*E21B 43/26* (2006.01)
(Continued)

(52) U.S. Cl.
CPC ............ *E21B 43/263* (2013.01); *C09K 8/64* (2013.01); *C09K 8/72* (2013.01); *C09K 8/80* (2013.01);
(Continued)

(58) Field of Classification Search
CPC ........ E21B 43/25; E21B 43/26; E21B 43/263; E21B 43/11; E21B 43/267
See application file for complete search history.

(56) References Cited

U.S. PATENT DOCUMENTS

| 1,354,640 A | 10/1920 | Woodbridge, Jr. |
| 1,955,927 A | 4/1934 | McBride |

(Continued)

FOREIGN PATENT DOCUMENTS

| WO | 2008/027982 A2 | 3/2008 |
| WO | 2016/065478 A1 | 5/2016 |
| WO | 2016/074075 A1 | 5/2016 |

OTHER PUBLICATIONS

International Preliminary Report on Patentability issued in related PCT Application No. PCT/US2017/045518 dated Feb. 13, 2021, 15 pages.

(Continued)

*Primary Examiner* — Kristyn A Hall
(74) *Attorney, Agent, or Firm* — Thomas Rooney; Baker Botts L.L.P.

(57) ABSTRACT

Methods for enhancing the conductivity of fractures in a subterranean formation using electrically controlled propellants are provided. In some embodiments, the methods comprise: introducing an electrically controlled propellant into one or more secondary boreholes in a subterranean formation near a main well bore that penetrates the subterranean formation; igniting the electrically controlled propellant in the secondary boreholes, whereby at least a portion of the region of the subterranean formation near the secondary borehole is at least partially ruptured by the ignition of the electrically controlled propellant in the secondary boreholes; and introducing a fracturing fluid into the main wellbore at or above a pressure sufficient to create or enhance at least one primary fracture in the subterranean (Continued)

formation that extends into at least a portion of the ruptured region of the subterranean formation.

20 Claims, 4 Drawing Sheets

(51) Int. Cl.
| | |
|---|---|
| *C09K 8/64* | (2006.01) |
| *C09K 8/72* | (2006.01) |
| *C09K 8/80* | (2006.01) |
| *E21B 43/1185* | (2006.01) |
| *E21B 43/267* | (2006.01) |
| *E21B 43/16* | (2006.01) |
| *E21B 43/17* | (2006.01) |
| *C09K 8/584* | (2006.01) |
| *C09K 8/62* | (2006.01) |

(52) U.S. Cl.
CPC .......... *E21B 43/1185* (2013.01); *E21B 43/16* (2013.01); *E21B 43/17* (2013.01); *E21B 43/267* (2013.01); *E21B 43/2607* (2020.05); *C09K 8/584* (2013.01); *C09K 8/62* (2013.01)

(56) References Cited

U.S. PATENT DOCUMENTS

| | | | |
|---|---|---|---|
| 2,771,035 A | 11/1956 | Clark | |
| 2,989,388 A | 6/1961 | Toulmin, Jr. | |
| 3,653,993 A | 4/1972 | Batchelder et al. | |
| 3,834,956 A | 9/1974 | Mellow et al. | |
| 5,149,384 A | 9/1992 | Marion | |
| 5,346,015 A | 9/1994 | Grundmann | |
| 5,734,124 A | 3/1998 | Bruenner et al. | |
| 6,361,629 B2 | 3/2002 | Mahaffy | |
| 6,623,574 B1 | 9/2003 | Wu | |
| 7,647,763 B2 | 1/2010 | Joshi et al. | |
| 7,887,650 B2 | 2/2011 | Kitayama et al. | |
| 7,942,990 B2 | 5/2011 | Kitayama et al. | |
| 7,958,823 B2 | 6/2011 | Sawka | |
| 8,033,021 B2 | 10/2011 | Joshi et al. | |
| 8,317,952 B2 | 11/2012 | Katzakian et al. | |
| 8,317,953 B2 | 11/2012 | Sawka et al. | |
| 8,469,110 B2 | 6/2013 | Sanders et al. | |
| 8,607,704 B2 | 12/2013 | Stark et al. | |
| 8,617,327 B1 | 12/2013 | Katzakian et al. | |
| 8,689,876 B2 | 4/2014 | Loree et al. | |
| 8,888,935 B2 | 11/2014 | Grix et al. | |
| 8,931,553 B2 | 1/2015 | Cannan et al. | |
| 9,027,641 B2 | 5/2015 | Alekseenko et al. | |
| 9,057,261 B2 | 6/2015 | Walters et al. | |
| 9,062,545 B2 | 6/2015 | Roberts et al. | |
| 9,080,441 B2 | 7/2015 | Meurer et al. | |
| 9,182,207 B2 | 11/2015 | McPherson et al. | |
| 9,243,182 B2 | 1/2016 | Lanctot-Downs et al. | |
| 9,328,034 B2 | 5/2016 | McPherson et al. | |
| 9,556,719 B1 | 1/2017 | Griffin | |
| 9,562,426 B2 | 2/2017 | Roberts et al. | |
| 2007/0215347 A1 | 9/2007 | Tang | |
| 2011/0192601 A1 | 8/2011 | Bahorich et al. | |
| 2012/0179444 A1 | 7/2012 | Ganguly et al. | |
| 2013/0000908 A1 | 1/2013 | Walters et al. | |
| 2013/0161007 A1 | 6/2013 | Wolfe et al. | |
| 2013/0327529 A1 | 12/2013 | Sprouse | |
| 2013/0341029 A1 | 12/2013 | Roberts et al. | |
| 2014/0299318 A1 | 10/2014 | Crews et al. | |
| 2015/0021023 A1 | 1/2015 | Roberts et al. | |
| 2015/0129230 A1* | 5/2015 | Carlson .................. | E21B 43/00 166/308.1 |
| 2016/0053160 A1 | 2/2016 | Nguyen et al. | |
| 2016/0153271 A1 | 6/2016 | Mace et al. | |
| 2016/0230526 A1 | 8/2016 | Crews et al. | |
| 2016/0244659 A1 | 8/2016 | Shahin et al. | |

OTHER PUBLICATIONS

Office Action issued in related Canadian Application No. 3066346 dated Mar. 24, 2021, 6 pages.

Cipolla, Craig L., et al. "The relationship between fracture complexity, reservoir properties, and fracture-treatment design." SPE production & Operations 25.04 (2010): 438-452.

International Search Report and Written Opinion issued in related PCT Application No. PCT/US2017/045518 dated May 3, 2018, 18 pages.

International Search Report and Written Opinion issued in related PCT Application No. PCT/US2017/060631 dated Apr. 12, 2018, 16 pages.

\* cited by examiner

METHODS FOR ENHANCING HYDROCARBON PRODUCTION FROM SUBTERRANEAN FORMATIONS USING ELECTRICALLY CONTROLLED PROPELLANT

CROSS-REFERENCE TO RELATED APPLICATION

The present application is a U.S. National Stage Application of International Application No. PCT/US2017/045518 filed Aug. 4, 2017, which is incorporated herein by reference in its entirety for all purposes.

BACKGROUND

The present disclosure relates to systems and methods for fracturing in subterranean formations.

Wells in hydrocarbon-bearing subterranean formations are often stimulated to produce hydrocarbons using hydraulic fracturing treatments. In hydraulic fracturing treatments, a viscous fracturing fluid, which also may function as a carrier fluid, is pumped into a producing zone at a sufficiently high rate and/or pressure such that one or more fractures are formed in the zone. These fractures provide conductive channels through which fluids in the formation such as oil and gas may flow to a well bore for production. In order to maintain sufficient conductivity through the fracture, it is often desirable that the formation surfaces within the fracture or "fracture faces" be able to resist erosion and/or migration to prevent the fracture from narrowing or fully closing. Proppant particulates may be suspended in a portion of the fracturing fluid and deposited in the fractures when the fracturing fluid is converted to a thin fluid to be returned to the surface. These proppant particulates serve to prevent the fractures from fully closing so that conductive channels are formed through which produced hydrocarbons can flow.

In many current fracturing treatments performed in shale reservoirs, large amounts of water or other fluids (e.g., an average of 1 million gallons per fracturing stage) are often pumped at high rates in order to provide sufficient downhole treating pressure to form fractures in the formation of the desired geometries. Large amounts of proppant are also often used in these operations; however, those proppants must be sized carefully to prevent premature screenout during their placement into the fractures and efficiently prop open fractures in the well system. Further, the fluids carrying those proppants must have sufficient viscosity to carry those proppants to their desired locations or be injected at a higher rate to provide high fluid velocity to overcome settling of proppant and transport the particulates into the fractures. Providing the large amounts of pumping power, water, and proppants for these operations, and the disposal of water flowing back out of the formation after these hydraulic fracturing treatments, are often costly and time-consuming, and make fracturing operations uneconomical in many circumstances.

BRIEF DESCRIPTION OF THE DRAWINGS

These drawings illustrate certain aspects of some of the embodiments of the present disclosure, and should not be used to limit or define the claims.

Figure 1:
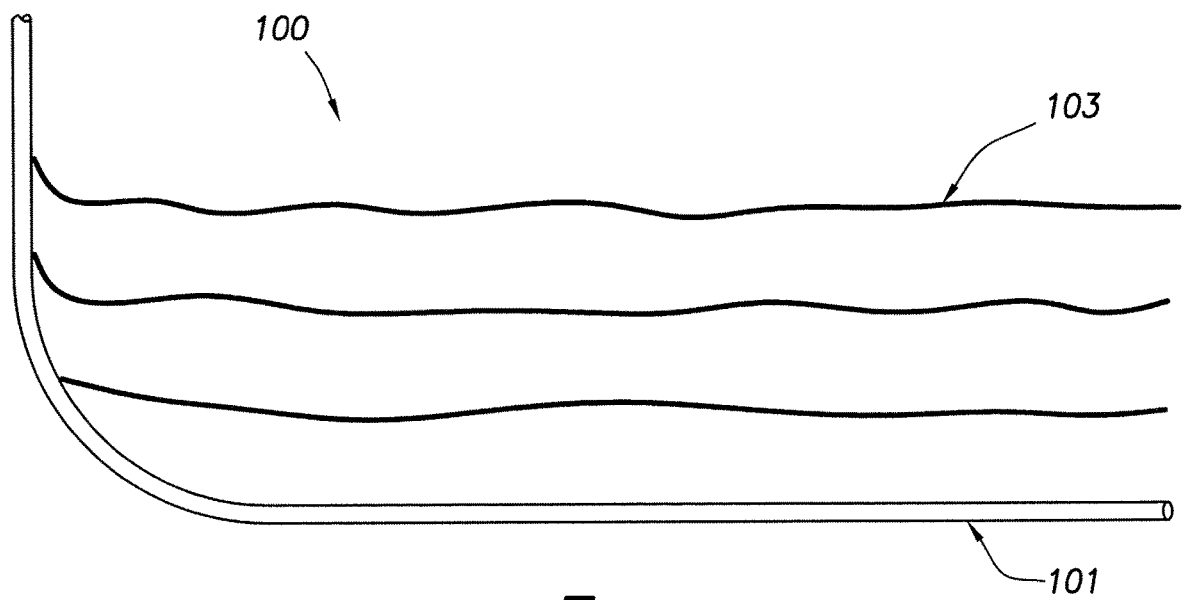
FIG. 1 is a diagram illustrating a portion of a subterranean formation in which an operation may be performed in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for fracturing treatments in subterranean formations. More particularly, the present disclosure relates to systems and methods for enhancing the conductivity of fractures in a subterranean formation using electrically controlled propellant (ECP).

The present disclosure provides methods and systems using electrically controlled propellant to generate complex fracture networks in subterranean formations, particularly in tight formations. In accordance with the methods of the present disclosure, a main well bore is drilled to penetrate at least a portion of a subterranean formation of interest, and optionally may be cased and/or otherwise completed. Then, one or more secondary boreholes (e.g., lateral boreholes) are drilled in the subterranean formation in a region near the main well bore. An electrically controlled propellant is introduced into the secondary boreholes. The electrically controlled propellant is then ignited to at least partially rupture a portion of the subterranean formation, forming a complex fracture network comprised of secondary or tertiary fractures (e.g., cracks or fissures) therein. In certain methods of the present disclosure, these secondary and tertiary fractures can be connected to a primary fracture, which may be formed by isolating and perforating an area of interest in the main well bore, and introduction of a high viscosity fluid at or above a pressure sufficient to create or enhance at least one primary fracture within the subterranean formation. Connection of the primary fracture to the complex fracture network may, among other benefits, enhance production of hydrocarbons from the subterranean formation.

Among the many potential advantages to the methods and compositions of the present disclosure, only some of which are alluded to herein, the methods, compositions, and systems of the present disclosure may help optimize fracturing treatments in a number of ways. For example, in some embodiments, the methods of the present disclosure may reduce or eliminate the use of large volumes of fluids (e.g., water) and/or proppants used in conventional fracturing treatments, and/or reduce the amount of pumping horsepower required to create complex fracturing geometries in subterranean shale formations. Reducing the amount of water used in fracturing operations may, among other benefits, reduce flowback volume and/or costs of disposing flowback water. Reducing or eliminating the amount of fracturing sand or other proppants used in fracturing operations may, among other benefits, simplify the composition of fracturing fluids that no longer need to suspend proppant particulates, reduce proppant settling issues, may decrease the abrasion to well site equipment from pumping proppant slurries into the formation, and/or minimize the maintenance cost of pumping equipment. In certain embodiments, the ignition of electrically controlled propellants used in the methods and systems of the present disclosure may be more effectively controlled as compared to other types of explosives or downhole energy sources. For example, these electrically controlled propellants may be less likely to spontaneously ignite, particularly at elevated pressure and/or temperature conditions experienced downhole. For these and other reasons, the methods and systems of the present disclosure may present fewer or less significant safety risks in their manufacturing, transportation, handling, and use than other methods and systems using other energy sources. Moreover, in some embodiments, it may be possible to cease the ignition of an electrically controlled propellant (e.g., by discontinuing the flow of electrical current therethrough), and then re-ignite the remaining portion of material at a subsequent time by re-applying electrical current to that same area. Consequently, in some embodiments, the methods and systems of the present disclosure may provide ways of fracturing or otherwise stimulating subterranean formations that can be used or actuated repeatedly without repeated interventions in the same well or placement of additional treatment fluids therein. Further, in some embodiments, the use of electrically controlled propellant to generate complex fracture networks in the secondary boreholes may protect the integrity of the main well bore, particularly where the main well bore is cased and/or otherwise completed before the electrically controlled propellant is used to rupture the subterranean formation at a distance from the main well bore.

The electrically controlled propellants of the present disclosure may comprise any substance known in the art that can be ignited by passing an electrical current through the propellant. The electrically controlled propellant may be provided as a liquid, or as a solid or semi-solid (e.g., powders, pellets, etc.) dissolved, dispersed, or suspended in a carrier liquid. In some embodiments, a liquid form of electrically controlled propellant may be particularly suited to penetrating smaller cracks, microfractures, and/or bedding planes in a formation, among other reasons, to more effectively place the electrically controlled propellant in those areas.

In some embodiments, the liquid propellant, or a mixture of a liquid propellant and a solid propellant, is stored in a combustible container, bag, or hose, while it is being placed in the secondary borehole. In some embodiments, the combustible container, bag, or hose could be made of metal. In some embodiments, a detonation cord could be attached to the combustible container, bag, or hose to allow for efficient ignition of the electrically controlled propellant.

In some embodiments, electrically-controlled propellants provided in solid form may be used in lieu of or in combination with other proppant materials to prop open small cracks, fractures, or bedding planes in the formation (e.g., in the far well bore region of the formation) when the fracturing fluid pressure is released. In some embodiments, the electrically controlled propellant may be provided in a composition that comprises a mixture of one or more electrically controlled propellants and other materials, including but not limited to inert materials such as sand, cement, fly ash, fiberglass, ceramic materials, carbon fibers, polymeric materials, clay, acid soluble materials, degradable materials (e.g., polylactic acid), and the like. In certain embodiments, the electrically controlled propellant may comprise a binder (e.g., polyvinyl alcohol, polyvinylamine nitrate, polyethanolaminobutyne nitrate, polyethyleneimine nitrate, copolymers thereof, and mixtures thereof), an oxidizer (e.g., ammonium nitrate, hydroxylamine nitrate, and mixtures thereof), and a crosslinking agent (e.g., boric acid). Such propellant compositions may further comprise additional optional additives, including but not limited to stability enhancing or combustion modifying agents (e.g., 5-aminotetrazole or a metal complex thereof), dipyridyl complexing agents, polyethylene glycol polymers, and the like. In certain embodiments, the electrically controlled propellant may comprise a polyalkylammonium binder, an oxidizer, and a eutectic material that maintains the oxidizer in a liquid form at the process temperature (e.g., energetic materials such as ethanolamine nitrate (ETAN), ethylene diamine dinitrate (EDDN), or other alkylamines or alkoxylamine nitrates, or mixtures thereof). Such propellants may further comprise a mobile phase comprising at least one ionic liquid (e.g., an organic liquid such as N,n-butylpyridinium nitrate). Certain of the aforementioned propellants may be commercially available from Digital Solid State Propulsion, Inc. of Reno, Nev.

As noted above, an electrical current must be applied to the electrically controlled propellant to ignite it in the methods of the present disclosure where such propellants are used. That electrical current may be transmitted or otherwise provided to the electrically controlled propellant in the formation using any means known in the art. In some embodiments, electrical current is provided from a direct current (DC) source, although electrical power from alternating current (AC) sources can be used as well. In some embodiments, the source of electrical current may be provided at the surface, and the current may be transferred via a conductive wire, cable, and/or tubing into the subterranean formation to the electrically controlled propellant and/or another electrically conductive material in contact with the propellant. In these embodiments, the electrical current may pass through any number of secondary relays, switches, conduits (e.g., wires or cables), electrodes, equipment made of conductive material (e.g., metal casings, liners, etc.) or other electrically conductive structures. In other embodiments, the electrical current also may be provided by some other downhole energy source (such as downhole charges, hydraulic power generators, batteries, or the like), and then applied to the electrically controlled propellant in the formation. In certain embodiments, the amount of electrical current applied to ignite the electrically controlled propellant may range from about 1 milliamp to about 100 milliamps. In certain embodiments, the electrical current applied to ignite the electrically controlled propellant may have a corresponding voltage of from about 10 V to about 600 V.

The electrically controlled propellant may be ignited at any time, and the application of electrical current to the propellant may be triggered in any known way. In some embodiments, the current may be applied in response to manual input by an operator, either at the surface of the well site or from a remote location. In other embodiments, the current may be applied automatically in response to the detection of certain conditions in the formation using one or more downhole sensors. Examples of downhole sensors that may be used in this way include, but are not limited to, pressure sensors, temperature sensors, water sensors, motion sensors, chemical sensors, and the like.

In some embodiments, the electrical current may be applied to the electrically controlled propellant substantially continuously until substantially all of the propellant has been ignited or the desired fracture geometries have been created in the formation. In other embodiments, the electrical current may be applied to the electrically controlled propellant intermittently. The intermittent ignition of the propellant may generate a series of shorter pulses of energy and/or pressure in the area of the formation proximate to the secondary boreholes. The cracks and fractures in the formation may be permitted to relax or constrict between these intermittent pulses, which may facilitate the creation of more complex fracture geometries and/or more conductive fractures.

In some embodiments, the electrical current may be applied intermittently at a frequency that is equal to or approximates a resonant frequency of the region in the subterranean formation near the main well bore in order to throttle the burning rate of the electrically controlled propellant. Applying the electrical current at a frequency equal to or approximates the resonant frequency of the region in the subterranean formation near the main well bore may help to maximize the fracturing efficiency of the electrically controlled propellant. In other embodiments, the intermittent detonation of the electrically controlled propellant may be timed between two or more lateral boreholes in order to achieve a pulsing effect. The pulsing effect may be equal to or approximate the resonant frequency of the region in the subterranean formation near the main well bore and help to maximize the fracturing efficiency of the electrically controlled propellant.

An example of fracture network created and/or enhanced according to certain methods of the present disclosure is illustrated in FIGS. 1-4. Referring now to FIG. 1, a main well bore 101 is shown penetrating a portion of a subterranean formation 100. In some embodiments, the main well bore 101 may have been at least partially cased and/or cemented during or prior to the remaining portions of the operation. The portion of the well bore 101 shown in FIGS. 1-4 is oriented horizontally, although a person of skill in the art with the benefit of this disclosure will recognize that the methods of the present disclosure could be similarly applied to sections of a well bore that are vertical or deviated from vertical to a lesser degree.

At least one secondary lateral borehole 103 has been drilled near the main well bore 101. The secondary boreholes 103 shown in FIGS. 1-4 are drilled at a depth closer to the surface than the main well bore, although a person of skill in the art with the benefit of this disclosure will recognize that the methods of the present disclosure could similarly be applied to secondary boreholes drilled at a greater depth than the main well bore, or around the same depth as the main well bore. In some embodiments, the secondary boreholes are drilled substantially parallel to the main well bore. In some embodiments, the secondary boreholes 103 will be spaced at least 25 feet away from the main well bore 101, among other reasons, to protect the integrity of the main well bore 101. The secondary boreholes 103 shown in FIGS. 1-4 are oriented horizontally, although a person of skill in the art with the benefit of this disclosure will recognize that the methods of the present disclosure could be similarly applied to sections of a well bore that are vertical or deviated from vertical to a lesser degree, in which the secondary boreholes would also be vertical or deviated from vertical to a lesser degree. Additionally, the secondary boreholes 103 shown in FIGS. 1-4 have been drilled off of the main well bore 101, although, a person of skill in the art with the benefit of this disclosure will recognize that the secondary boreholes could also be drilled off of another well bore that penetrates the subterranean formation. Further, multiple secondary boreholes 103 are shown in FIGS. 1-4, although a person of skill in the art with the benefit of this disclosure will recognize that more secondary boreholes or fewer secondary boreholes (e.g., as few as one secondary borehole) could be used in some embodiments.

In some embodiments, the secondary boreholes 103 can be drilled using coiled tubing. Coiled tubing could be coupled with a drill bit or a hydrojetting tool to drill and generate the lateral boreholes. The coiled tubing coupled with a hydrojetting tool could also be used to create slots or fractures along the lateral borehole, such that the electrically controlled propellant could be placed deeper inside the formation.

Figure 2:
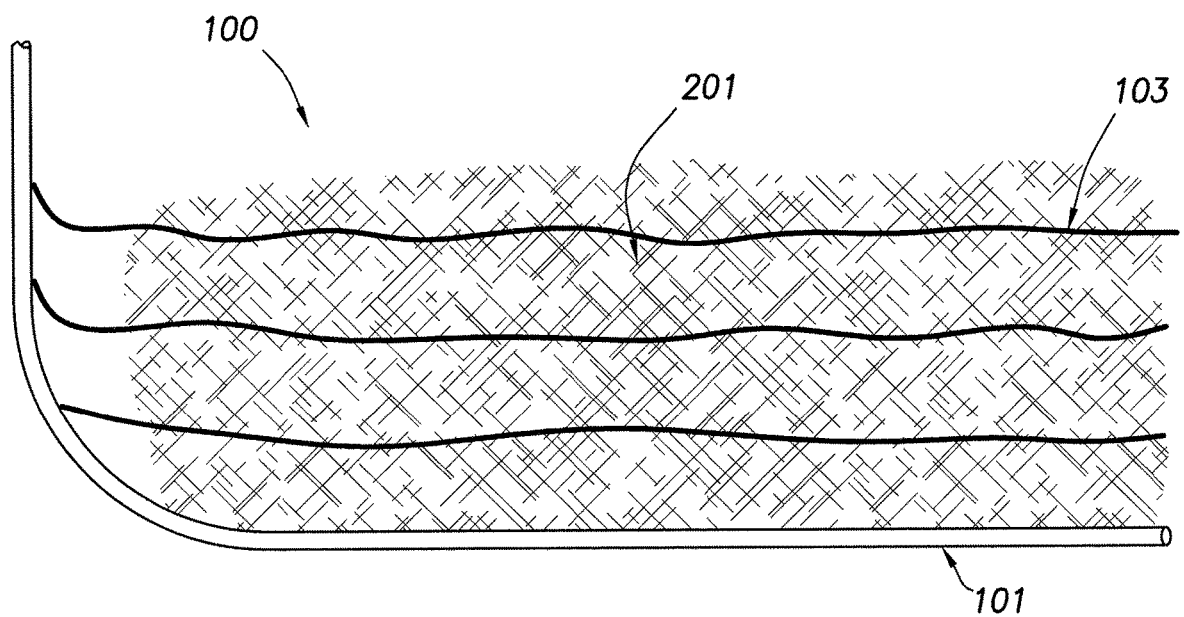
FIG. 2 is a diagram illustrating the portion of a subterranean formation from FIG. 1 after the introduction and ignition of electrically controlled propellant therein in accordance with certain embodiments of the present disclosure.

An electrically controlled propellant is introduced into the secondary boreholes 103. In some embodiments, the electrically controlled propellant is introduced into the secondary boreholes 103 while the coiled tubing is removed from (e.g., tripped out of) the secondary borehole 103. The electrically controlled propellant can be ignited within the secondary borehole 103. The ignition of the electrically controlled propellant at least partially ruptures a portion of the subterranean formation 100 and may cause rubblization of the subterranean formation adjacent the borehole, breaking of the fabric structure of the subterranean formation matrix, weakening of the bedding planes to cause tensile and shear failures, or a combination thereof. In any event, the ignition of the electrically controlled propellant generates a complex fracture network 201 comprised of numerous secondary and tertiary fractures, cracks, and micro-fractures throughout the subterranean formation adjacent to the secondary boreholes 103, as shown in FIG. 2.

In some embodiments, the ignition of the electrically controlled propellant may generate or break off small fragments of the formation that may become deposited within the cracks and fractures in the formation and act as in-situ proppant therein. Creation of in-situ proppant may help to hold the fractures of the complex fracture network 201 open and facilitate production of hydrocarbons from the subterranean formation.

Figure 3:
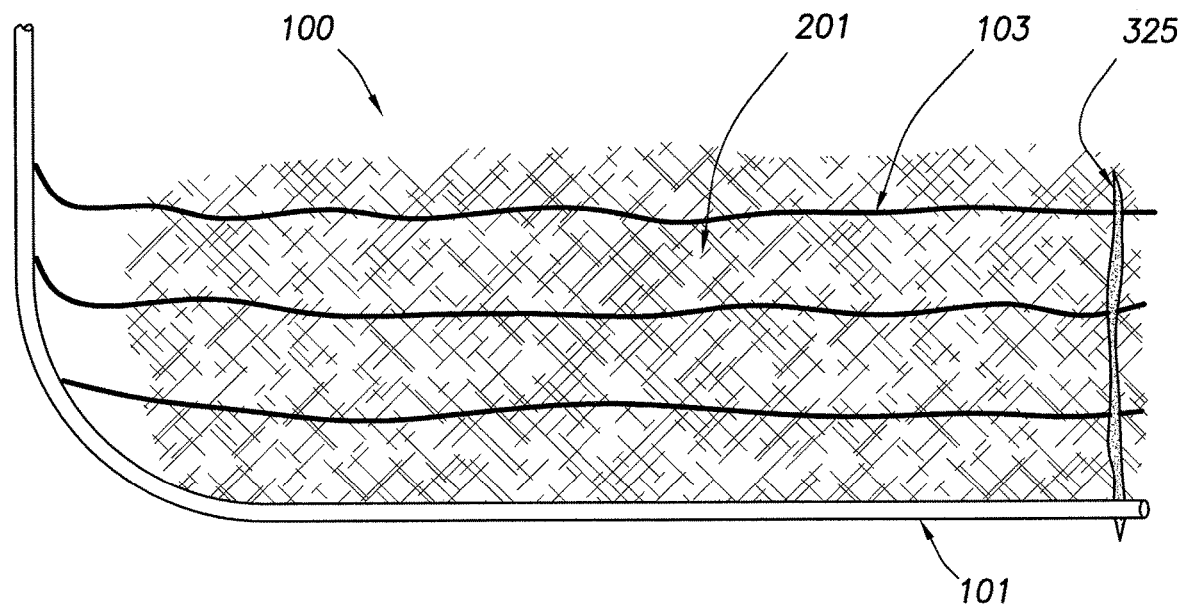
FIG. 3 is a diagram illustrating the portion of a subterranean formation from FIG. 2 after the creation of a primary fracture in accordance with certain embodiments of the present disclosure.

Referring now to FIG. 3, a primary fracture 325 is formed to extend from the main well bore 101. The primary fracture 325 may have been created by introducing a fracturing fluid into the main well bore 101 at or above a pressure sufficient to create or enlarge the fracture 325. Perforations can be formed in the casing to allow fracturing fluids and/or other materials to flow into the subterranean formation 100. Perforations can be formed using any known means, including shape charges, a perforating gun, and hydro-jetting and/or other tools (e.g., StimGun™). The portion of the well bore 101 proximate to the portion of the subterranean formation 100 to be fractured also may be isolated using any known method of zonal isolation, including but not limited to packers, plugs, sand, gels, valves, and the like. In some embodiments, after isolating and perforating an area of interest, a fracturing fluid (e.g., a high viscosity fluid) is introduced at or above a pressure sufficient to create or enhance at least one primary fracture in the subterranean formation. In some embodiments, the high viscosity fluid has a fluid viscosity of about 100 cP or higher, up to about 5,000 cP.

In some embodiments, the complex fracture network 201 created by ignition of the electrically controlled propellant can be connected to the primary fracture 325. Connection of the complex fracture network 201 to the primary fracture 325 may facilitate production of the hydrocarbons from the subterranean formation into the main well bore 101 while maintaining the integrity of the main well bore 101.

In some embodiments, a first low viscosity fluid is introduced into the main well bore 101 after creation of the primary fracture at or above a pressure sufficient to create or enhance at least one fracture in the subterranean formation. In some embodiments, the low viscosity fluid has a fluid viscosity of about 25 cP or lower. The first low viscosity fluid may carry microproppant. In some embodiments of the present disclosure, the microproppant can include any particle having a mean particle size of up to about 50 µm. Microproppant materials that may be suitable for use include, but are not limited to, silica, fly ash, ceramic particles, iron oxide particles, carbon tubes, cellulose fibers, glass particles, glass fibers, composite particles, and thermoplastic particles. Introduction of the first low viscosity fluid with microproppant may extend the primary fracture 325 and/or place the microproppant particles in the induced microfractures or fissures of the complex fracture network 201 to keep them open. In some embodiments, the fracturing fluid and/or the first low viscosity fluid further comprises one or more chelating agents, acids, or delayed, in-situ acid generators. These agents may produce one or more acids in the formation, which may dissolve or otherwise interact with rock in the formation to increase its porosity and/or conductivity, which may enhance the connectivity between the complex fracture network 201 and the larger fracture branches and the primary fracture 325.

In some embodiments, following the introduction of the first low viscosity fluid, a second low viscosity fluid is introduced into the main well bore 101 at or above a pressure sufficient to create or enhance at least one fracture in the subterranean formation. The second low viscosity fluid may carry proppant. Proppant materials that may be suitable for use include, but are not limited to, natural sands; resin-coated sands, curable resin-coated proppants; gravels; synthetic organic particles, nylon pellets, high density plastics, composite polymers, polytetrafluoroethylenes, rubbers, resins; ceramics, aluminosilicates; glass; sintered bauxite; quartz; aluminum pellets, metal shots; ground or crushed shells of nuts, walnuts, pecans, almonds, ivory nuts, brazil nuts, or combinations thereof. In some embodiments, the second low viscosity fluid can comprise a gradual increase in mesh sizes (e.g., 200-mesh to 100-mesh to 40/70-mesh) and concentrations of proppant (e.g., 0.5 lbm/gal to 1 lbm/gal to 2 lbm/gal) to place the proppant in the primary fracture and large fracture branches.

In some embodiments, a large volume of the high viscosity fluid is introduced into the main well bore 101, followed by intermittent or alternating introductions of a small volume of the first low viscosity fluid containing microproppant. In this embodiment, introduction of the high viscosity fluid may extend the length and height of the primary fracture, while introduction of the low viscosity fluid may induce the development of secondary fractures along the primary fracture and allow for placement of microproppant in the microfractures.

Figure 4:
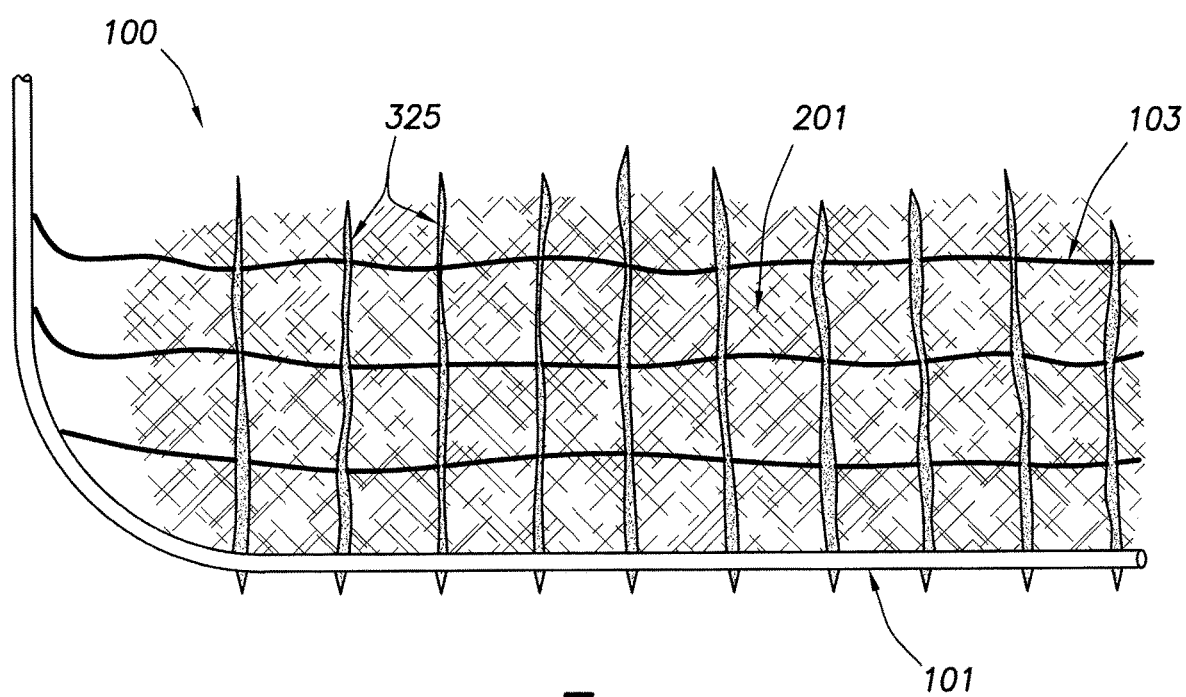
FIG. 4 is a diagram illustrating the portion of a subterranean formation from FIG. 3 after the creation of multiple primary fractures in accordance with certain embodiments of the present disclosure.

In some embodiments, as shown in FIG. 4, multiple primary fractures 325 are created by repeating the isolating and fracturing sequence described above for multiple intervals along the main well bore. In some embodiments, the one or more intervals start from the toe or far end of the main well bore, thereby providing effective production of hydrocarbons from the formation.

The treatment fluids (e.g., fracturing fluids, high/low viscosity fluids) used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

Moreover, in some embodiments, certain brine-based fluids may exhibit certain electrical conductivity properties, which may facilitate ignition of the electrically controlled propellant once placed in the secondary boreholes within the subterranean formation. Examples of non-aqueous fluids (liquids or gases) that may be suitable for use in the methods and systems of the present disclosure include, but are not limited to, oils, hydrocarbons (e.g., liquefied natural gas (LNG), methane, etc.), organic liquids, carbon dioxide, nitrogen, and the like. In certain embodiments, the fracturing fluids, and other treatment fluids described herein may comprise a mixture of one or more fluids and/or gases, including but not limited to emulsions, foams, and the like.

In some embodiments, certain fracturing fluids or other treatment fluids used in the methods of the present disclosure may be substantially "waterless" in that they do not comprise a significant amount of water (e.g., less than 5%, 1%, or 0.1% by volume), or alternatively, any amount of water. In some embodiments, certain fracturing fluids or other treatment fluids (e.g., fluids used to place additional or secondary electrically controlled propellant, such as a liquid electrically controlled propellant) may be substantially "solids-free" in that they do not comprise a significant amount of solid material (e.g., less than 5%, 1%, or 0.1% by weight), or alternatively, any amount of solid material.

In some embodiments, a low viscosity fluid is substantially "waterless." Examples of a substantially "waterless" fluid according to the present disclosure include, but are not limited to, liquid methane, liquefied natural gas, liquid gas hydrocarbon, liquid $CO_2$, liquid $N_2$, or any combination thereof. In some embodiments, a substantially "waterless" low viscosity fluid is preferred.

In some embodiments, a fracturing fluid comprises a waterless fluid. Examples of waterless fluids that can be used as fracturing fluids according to the present disclosure include, but are not limited to, a foamed liquid gas, such as a foamed natural gas liquid, a foamed liquid gas hydrocarbon, a foamed liquid $CO_2$, a foamed liquid $N_2$, or any combination thereof. In some embodiments, a substantially "waterless" fracturing fluid is preferred.

In some embodiments, the viscosity of the treatment fluid(s) used during different portions of the methods of the present disclosure optionally may be varied, among other reasons, to provide different amounts of fluid loss control and/or leakoff that may be useful during those different steps. For example, in some embodiments, the fracturing fluid introduced at or above a pressure sufficient to create or enhance a primary fracture may be relatively viscous (e.g., about 100 cP or higher, up to about 5,000 cP), among other reasons, to minimize fluid leakoff and maintain a high bottomhole treating pressure in the formation. The higher viscosity of this fluid also may facilitate suspension of proppant particulates to be deposited in the near well bore portion of the primary fracture. Any compatible, known viscosifying agents as well as any compatible, known crosslinking agents (e.g., metal carboxylate crosslinkers) capable of crosslinking the molecules of a polymeric viscosifying agent may be used in accordance with the methods of the present disclosure.

In some embodiments, a substantially waterless fluid is viscosified with a viscosifier to transform it into a high viscosity fluid. This process minimizes leakoff during the initial introduction of the fluid for generating a primary fracture. A low viscosity fluid will enhance leakoff for generating secondary and tertiary fractures.

In certain embodiments, the treatment fluids used in the methods and systems of the present disclosure optionally may comprise any number of additional additives. Examples of such additional additives include, but are not limited to, salts, surfactants, acids, proppant particulates (e.g., frac sand), diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, crosslinking agents, breakers, weighting agents, relative permeability modifiers, resins, wetting agents, coating enhancement agents, filter cake removal agents, antifreeze agents (e.g., ethylene glycol), and the like. In certain embodiments, a near-well bore degradable fluid-loss control additive may be introduced into the subterranean formation to generate a new primary fracture in the same perforation cluster. In certain embodiments, a far-field degradable fluid-loss control additive may be introduced into the subterranean formation to enhance generation of the microfractures or fissures for enhancing connectivity with the complex networks created by the ignition of the electrically controlled propellant in the secondary boreholes. In certain embodiments, a chelating agent, an acid, and/or a delayed, in situ acid generator may be added to the low viscosity fluid. A person skilled in the art, with the benefit of this disclosure, will recognize the types of additives that may be included in the fluids of the present disclosure for a particular application.

In some embodiments, a displacement fluid may be injected through the secondary boreholes. The injection of this fluid through the secondary boreholes may enhance the sweeping efficiency of hydrocarbons for production through the primary and secondary fractures and into the main well bore 101.

Figure 5:
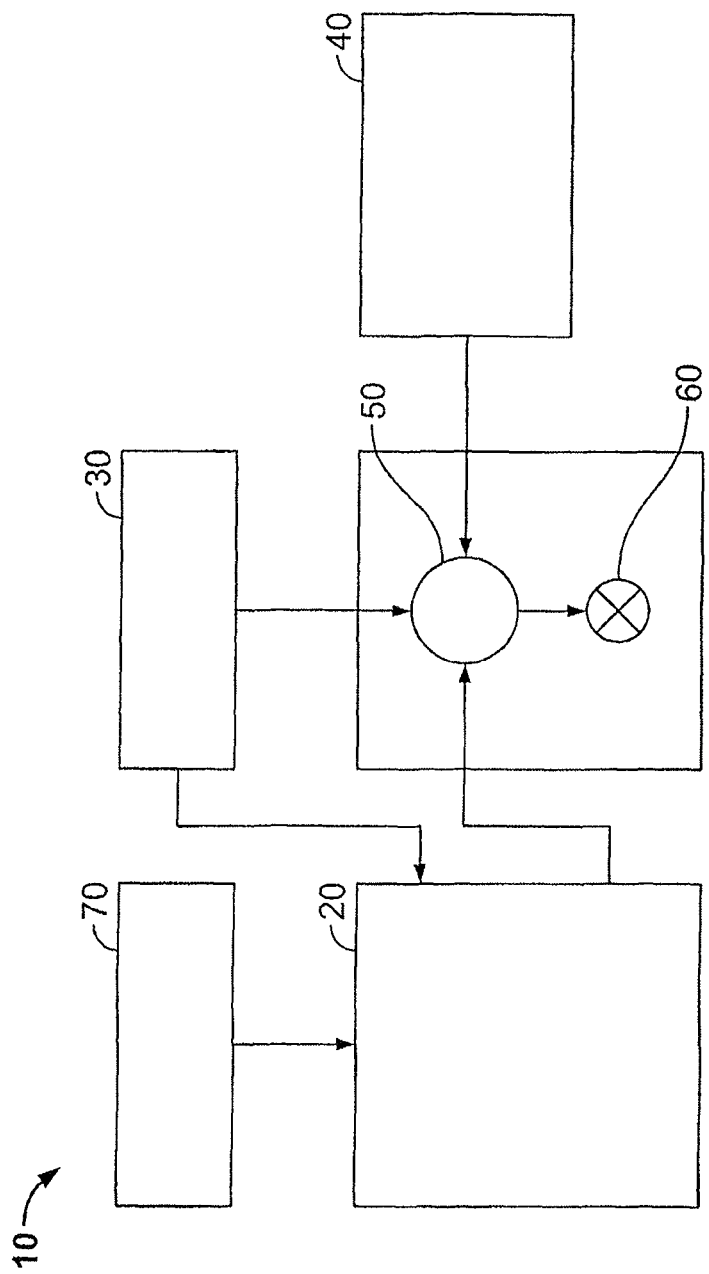
FIG. 5 is a diagram illustrating an example of a fracturing system that may be used in accordance with certain embodiments of the present disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 5, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, breaking agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 6:
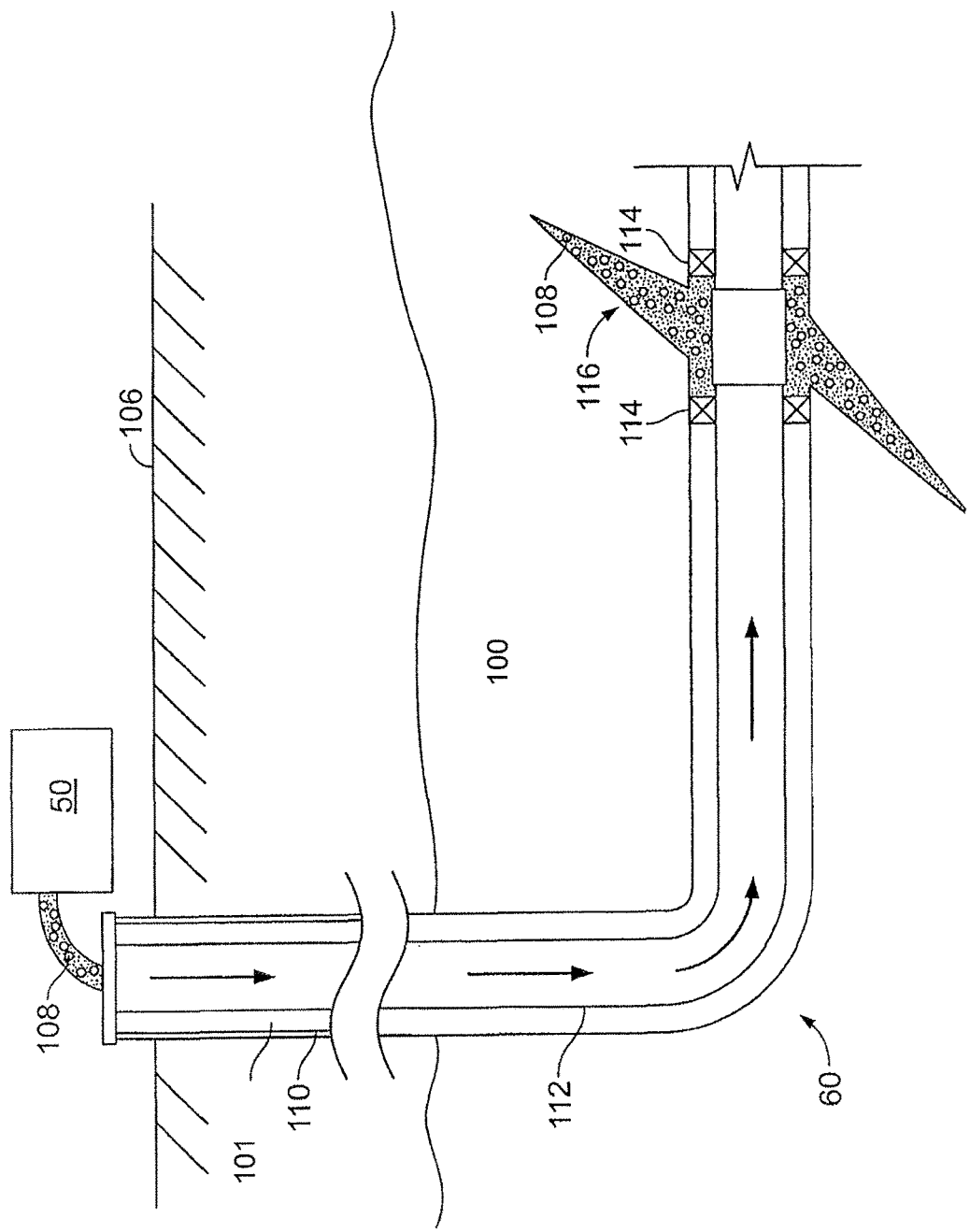
FIG. 6 is a diagram illustrating an example of a subterranean formation in which a fracturing operation may be performed in accordance with certain embodiments of the present disclosure.

FIG. 6 shows the well 60 during a fracturing operation in a portion of a subterranean formation of interest 100 surrounding a well bore 101. The well bore 101 extends from the surface 106, and the fracturing fluid 108 is applied to a portion of the subterranean formation 100 surrounding the horizontal portion of the well bore. Although shown as vertical deviating to horizontal, the well bore 101 may include horizontal, vertical, slant, curved, and other types of well bore geometries and orientations, and the fracturing treatment may be applied to a subterranean zone surrounding any portion of the well bore. The well bore 101 can include a casing 110 that is cemented or otherwise secured to the well bore wall. The well bore 101 can be uncased or include uncased sections. Perforations can be formed in the casing 110 to allow fracturing fluids and/or other materials to flow into the subterranean formation 100. In cased wells, perforations can be formed using shape charges, a perforating gun, hydro-jetting and/or other tools.

The well is shown with a work string 112 depending from the surface 106 into the well bore 101. The pump and blender system 50 is coupled a work string 112 to pump the fracturing fluid 108 into the well bore 101. The working string 112 may include coiled tubing, jointed pipe, and/or other structures that allow fluid to flow into the well bore 101. The working string 112 can include flow control devices, bypass valves, ports, and or other tools or well devices that control a flow of fluid from the interior of the working string 112 into the subterranean zone 100. For example, the working string 112 may include ports adjacent the well bore wall to communicate the fracturing fluid 108 directly into the subterranean formation 100, and/or the working string 112 may include ports that are spaced apart from the well bore wall to communicate the fracturing fluid 108 into an annulus in the well bore between the working string 112 and the well bore wall.

The working string 112 and/or the well bore 101 may include one or more sets of packers 114 that seal the annulus between the working string 112 and well bore 101 to define an interval of the well bore 101 into which the fracturing fluid 108 will be pumped. FIG. 6 shows two packers 114, one defining an uphole boundary of the interval and one defining the downhole end of the interval. When the fracturing fluid 108 is introduced into well bore 101 (e.g., in FIG. 6, the area of the well bore 101 between packers 114) at a sufficient hydraulic pressure, one or more fractures 116 may be created in the subterranean zone 100. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: introducing an electrically controlled propellant into one or more secondary boreholes in a subterranean formation near a main well bore that penetrates the subterranean formation; igniting the electrically controlled propellant in the secondary boreholes, whereby at least a portion of the region of the subterranean formation near the secondary borehole is at least partially ruptured by the ignition of the electrically controlled propellant in the secondary boreholes; and introducing a fracturing fluid into the main wellbore at or above a pressure sufficient to create or enhance at least one primary fracture in the subterranean formation that extends into at least a portion of the ruptured region of the subterranean formation.

Another embodiment of the present disclosure is a method comprising: introducing a fracturing fluid into a main well bore at or above a pressure sufficient to create or enhance at least one primary fracture in a subterranean formation that extends into at least a portion of a ruptured region of the subterranean formation, wherein an electrically controlled propellant has been introduced into one or more secondary boreholes in the subterranean formation near the main well bore that penetrates the subterranean formation, and wherein the electrically controlled propellant has been ignited in the secondary boreholes, whereby at least a portion of the region of the subterranean formation near the secondary borehole has been at least partially ruptured by the ignition of the electrically controlled propellant in the secondary borehole.

Another embodiment of the present disclosure is a method comprising: drilling a main well bore in a subterranean formation; drilling at least one secondary borehole in the subterranean formation in a region near the main well bore; introducing an electrically controlled propellant into the secondary boreholes; igniting the electrically controlled propellant in the secondary boreholes, whereby at least a portion of the region of the subterranean formation near the secondary borehole is at least partially ruptured by the ignition of the electrically controlled propellant in the secondary boreholes; and introducing a fracturing fluid into the main wellbore at or above a pressure sufficient to create or enhance at least one primary fracture in the subterranean formation that extends into at least a portion of the ruptured region of the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    introducing an electrically controlled propellant into one or more secondary boreholes in a subterranean formation near a main well bore that penetrates the subterranean formation;
    igniting the electrically controlled propellant in the secondary boreholes, whereby at least a portion of the region of the subterranean formation near the secondary borehole is at least partially ruptured by the ignition of the electrically controlled propellant in the secondary boreholes, wherein ignition of the electrically controlled propellant in the secondary boreholes causes the formation of a complex fracture network, the complex fracture network comprising one or more secondary or tertiary fractures in the subterranean formation; and
    introducing a fracturing fluid into the main wellbore at or above a pressure sufficient to create or enhance at least one primary fracture in the subterranean formation that extends into at least a portion of the ruptured region of the subterranean formation, wherein the fracturing fluid is a high viscosity fluid;

introducing a first low viscosity fluid at or above a pressure sufficient to create or enhance at least one fracture in the subterranean formation, wherein the first low viscosity fluid comprises a microproppant; and alternating introducing the first low viscosity fluid and the fracturing fluid, wherein the fracturing fluid at least partially enhances the primary fracture, and the first low viscosity fluid enhances the formation of secondary fractures to enhance connectivity with the fractures created in the ruptured region.

2. The method of claim 1 wherein the at least one primary fracture is at least partially connected to the complex fracture network.

3. The method of claim 1 wherein igniting the electrically controlled propellant comprises applying an electrical current to the electrically controlled propellant.

4. The method of claim 3 wherein the electrical current is applied to the electrically controlled propellant intermittently at a frequency that is equal to or approximates a resonant frequency of the region in the subterranean formation near the main well bore.

5. The method of claim 1 further comprising:
introducing a second low viscosity fluid at or above a pressure sufficient to create or enhance at least one fracture in the subterranean formation, wherein the second low viscosity fluid comprises proppant.

6. The method of claim 5 wherein the second low viscosity fluid comprises a gradual increase in a particle size of the proppant.

7. The method of claim 1 wherein the first low viscosity fluid contains at least one of a chelating agent, an acid, or a delayed, in situ acid generator.

8. The method of claim 1 wherein the first low viscosity fluid comprises a waterless fluid, comprising at least one of liquid methane, liquefied natural gas, liquid gas hydrocarbon, liquid CO2, liquid N2, or any combination thereof.

9. The method of claim 1 wherein the at least one secondary borehole is located at a distance of at least about 25 feet from the main well bore.

10. The method of claim 1 further comprising timing the ignition of the electrically controlled propellant between at least two secondary boreholes at a frequency equal to or approximates a resonant frequency of a rock formation to be ruptured in the subterranean formation.

11. The method of claim 1 wherein the fracturing fluid is introduced into the main well bore using one or more pumps.

12. A method comprising:
introducing a fracturing fluid into a main well bore at or above a pressure sufficient to create or enhance at least one primary fracture in a subterranean formation that extends into at least a portion of a ruptured region of the subterranean formation, wherein the fracturing fluid is a high viscosity fluid, wherein an electrically controlled propellant has been introduced into one or more secondary boreholes in the subterranean formation near the main well bore that penetrates the subterranean formation, and wherein the electrically controlled propellant has been ignited in the secondary boreholes, whereby at least a portion of the region of the subterranean formation near the secondary borehole has been at least partially ruptured by the ignition of the electrically controlled propellant in the secondary borehole;
introducing a first low viscosity fluid at or above a pressure sufficient to create or enhance at least one fracture in the subterranean formation, wherein the first low viscosity fluid comprises a microproppant; and
alternating introducing the first low viscosity fluid and the fracturing fluid, wherein the fracturing fluid at least partially enhances the primary fracture, and the first low viscosity fluid enhances the formation of secondary fractures to enhance connectivity with the fractures created in the ruptured region.

13. The method of claim 12 wherein ignition of the electrically controlled propellant in the lateral boreholes causes the formation of a complex fracture network, the complex fracture network comprising one or more secondary or tertiary fractures in the subterranean formation.

14. The method of claim 12 wherein igniting the electrically controlled propellant comprises applying an electrical current to the electrically controlled propellant.

15. The method of claim 14, wherein the electrical current has been applied to the electrically controlled propellant intermittently at a frequency that is equal to or approximates a resonant frequency of the region in the subterranean formation near the main well bore.

16. A method comprising:
drilling a main well bore in a subterranean formation;
drilling at least one secondary borehole in the subterranean formation in a region near the main well bore;
introducing an electrically controlled propellant into the secondary boreholes;
igniting the electrically controlled propellant in the secondary boreholes, whereby at least a portion of the region of the subterranean formation near the secondary borehole is at least partially ruptured by the ignition of the electrically controlled propellant in the secondary boreholes;
introducing a fracturing fluid into the main wellbore at or above a pressure sufficient to create or enhance at least one primary fracture in the subterranean formation that extends into at least a portion of the ruptured region of the subterranean formation, wherein the fracturing fluid is a high viscosity fluid;
introducing a first low viscosity fluid at or above a pressure sufficient to create or enhance at least one fracture in the subterranean formation, wherein the first low viscosity fluid comprises a microproppant; and
alternating introducing the first low viscosity fluid and the fracturing fluid, wherein the fracturing fluid at least partially enhances the primary fracture, and the first low viscosity fluid enhances the formation of secondary fractures to enhance connectivity with the fractures created in the ruptured region.

17. The method of claim 16 wherein ignition of the electrically controlled propellant in the secondary boreholes causes the formation of a complex fracture network, the complex fracture network comprising one or more secondary or tertiary fractures in the subterranean formation.

18. The method of claim 16 wherein igniting the electrically controlled propellant comprises applying an electrical current to the electrically controlled propellant.

19. The method of claim 16, further comprising timing the ignition of the electrically controlled propellant between at least two secondary boreholes at a frequency equal to or approximates a resonant frequency of a rock formation to be ruptured in the subterranean formation.

20. The method of claim 16, further comprising introducing a second low viscosity fluid at or above a pressure sufficient to create or enhance at least one fracture in the subterranean formation, wherein the second low viscosity fluid comprises proppant.

\* \* \* \* \*